United States Patent
von der Lippe

(10) Patent No.: US 11,320,992 B2
(45) Date of Patent: May 3, 2022

(54) SYSTEM AND METHOD TO CONTROL THE ACCESS ON INFORMATION OF A PERIPHERAL STORAGE DEVICE

(71) Applicant: Wincor Nixdorf International GmbH, Paderborn (DE)

(72) Inventor: Carsten von der Lippe, Paderborn (DE)

(73) Assignee: Wincor Nixdorf International GmbH, Paderborn (DE)

(*) Notice: Subject to any disclaimer, the term of this patent is extended or adjusted under 35 U.S.C. 154(b) by 0 days.

(21) Appl. No.: 16/420,132

(22) Filed: May 22, 2019

(65) Prior Publication Data

US 2019/0361615 A1 Nov. 28, 2019

(30) Foreign Application Priority Data

May 23, 2018 (EP) .................................. 18173835

(51) Int. Cl.
*G06F 3/06* (2006.01)

(52) U.S. Cl.
CPC .......... *G06F 3/0622* (2013.01); *G06F 3/0644* (2013.01); *G06F 3/0655* (2013.01); *G06F 3/0676* (2013.01); *G06F 3/0679* (2013.01)

(58) Field of Classification Search
CPC .... G06F 3/0622; G06F 3/0644; G06F 3/0655; G06F 3/0676; G06F 3/0679; G06F 19/209; G06F 19/206; G06F 19/207; G06F 21/34; G06F 21/79; G07F 19/209; G07F 19/206; G07F 19/207
See application file for complete search history.

(56) References Cited

U.S. PATENT DOCUMENTS

| | | | | |
|---|---|---|---|---|
| 6,507,905 | B1* | 1/2003 | Hubacher | G06F 3/0622 711/170 |
| 2006/0242066 | A1* | 10/2006 | Jogand-Coulomb | G06F 21/78 705/50 |
| 2007/0016743 | A1* | 1/2007 | Jevans | G06F 21/31 711/164 |
| 2010/0262773 | A1* | 10/2010 | Borchers | G06F 3/0619 711/114 |
| 2017/0243000 | A1* | 8/2017 | Shraim | H04L 9/00 |
| 2019/0303305 | A1* | 10/2019 | Mesropian | G06F 3/0673 |

* cited by examiner

*Primary Examiner* — Ramon A. Mercado
(74) *Attorney, Agent, or Firm* — Black, McCuskey, Souers & Arbaugh LPA

(57) ABSTRACT

A peripheral digital storage device has an interface allowing a connection to a self-service machine for performing maintenance operation to the self-service machine. The device provides a storage area divided into a set of partitions which are interpretable by the self-service machine as independent storage areas for file operation when connected to the self-service machine. A control unit which is configured to control the access to the partitions by refusing or granting the self-service machine an access to the partition depending on identity information receivable from the self-service machine for providing access to individual partitions for each assigned self-service machine connectable to the interface.

7 Claims, 5 Drawing Sheets

SYSTEM AND METHOD TO CONTROL THE ACCESS ON INFORMATION OF A PERIPHERAL STORAGE DEVICE

CROSS-REFERENCE TO RELATED APPLICATIONS

This application claims priority to and the benefit of European Patent Application EP 18 173 835.2 filed 23 May 2018, the contents of which are hereby incorporated by reference in their entirety.

BACKGROUND

In the field of self-service machines especially automated teller machine (ATM) a regular maintenance by service engineer/technician has to be performed to install upgrades of the software or repair and exchange components or to extract and/or download logs. An ATM is an electronic telecommunications device that enables customers of financial institutions to perform financial transactions, such as cash withdrawals, deposits, transfer funds, or obtaining account information, at any time and without the need for direct interaction with bank staff.

On most modern ATMs, customers are identified by inserting a plastic ATM card (or some other acceptable payment card) into the ATM, with authentication being by the customer entering a personal identification number (PIN) which must match the PIN stored in the chip on the card (if the card is so equipped) or in the issuing financial institution's database.

Using an ATM, customers can access their bank deposit or credit accounts in order to make a variety of financial transactions such as cash withdrawals, check balances, or credit mobile phones.

Very often the self-service machines are based on standard PCs (Personal computers) having interfaces to connect peripheral devices. The operating systems running on the self-service machines recognizes the peripheral devices when connected automatically and starts depending on the type of device different operation (e.g. Auto-play). The operations can cover the installation of device driver, storing or loading data to or from a peripheral storage device, starting programs etc.

Very often the peripheral devices are connected by a serial connection, like USB (Universal Serial Bus), fire wire, RS232 etc . . . . This, however, is not limited to the type of external Interfaces listed above.

A typical attack scenario today is to compromise a self-service machine by using plug-and-play mechanisms, for example, executing a code through auto-play functions after inserting a USB memory stick. Protection against such attacks is increasingly in demand in the self-service environment. The problem, however, is that the complete plug-and-play functionality cannot be blocked as a precaution because this also restricts the required functionality of a cash dispensing machine (ATM). Solutions that, for example, do not allow the recognition and processing of external devices on the USB driver level if they are not entered on white lists (e.g. the USB filter driver maintained as part of the Vynamic Security suite, a product of the applicant or US 2015/0206422 A1, US 2015/928400 A1) are not unreservedly effective and do not represent a complete solution.

But also this approach has a disadvantage since a USB drive which is not excluded by the filter can distribute Malware which has been loaded onto the stick by any other ATM or service laptop of the service engineer.

Malware in the context of this application is, short for malicious software, is an umbrella term used to refer to a variety of forms of harmful or intrusive software, including computer viruses, worms, Trojan horses, ransomware, spyware, adware, scareware, and other malicious programs. It can take the form of executable code, scripts, active content, and other software. Malware is defined by its malicious intent, acting against the requirements of the computer user—and so does not include software that causes unintentional harm due to some deficiency.

USB drives are usually used by service engineers to authenticate against the software on the ATM or to transport data like logs, lists, etc. to and from the ATM. An example is the CrypTA-Stick™ (Cryptographic Technician Authentication) which is a product of the applicant, assigning each service engineer, individual access rights on when perfuming a maintenance.

Basis of CrypTA™ are strong encryption algorithms combined with a smart card chip (crypto controller). This chip stores the necessary keys so that possible attackers can be fended off, regardless of whether the attacks are attempted directly or remotely.

This device controls the access to the ATM and also stores information about the ATM like events, history, documents etc. . . . . This information can be stored in protected (encrypted) or unprotected areas.

This memory area can be accessed if the service engineer grants the access. If the ATM is infected by malware, the malware can be distributed to other ATMs.

Due to the complex functionality of the USB storage device simply blocking any USB drive has a severe impact on the serviceability of an ATM.

SUMMARY

In at least one embodiment, a peripheral digital storage device, has an interface allowing a connection to a self-service machine, for performing maintenance operation to the self-service machine. The interface can be USB, firewire or any parallel or serial interface which allow to connect a peripheral storage device, on which data can be stored preferably as files.

The storage device may provide a storage area. For example, the storage area may be nonvolatile memory like flash memory, magnetic memory, or optical memory. Other technologies are also possible.

In at least one embodiment, the storage area is divided into set of partitions which are interpretable by the self-service machine as independent storage areas for file operation when connected to the self-service machine.

Furthermore, the storage device may include a control unit which is configured to control the access to the partitions by refusing or granting the self-service machine an access to the partition, depending on identity information receivable from the self-service machine for providing access to individual partitions for each assigned self-service machine connectable to the interface.

It has to be noted that the control unit preferably includes a crypto controller storing crypto keys in a secure manner and allowing crypto operations.

In this context, the partitioning can be implemented on different levels. The partitions can be defined by the control unit on different logical and/or physical levels comprising: memory cell level, memory chip level, block level, file system level etc. . . . .

The partitioning can be based on physical memory cells, so that a certain number of cells define a partition. The control unit provides several independent disks to the operating system. It is also possible that each memory chip or a group of chips define a partition that is controlled by the control unit, and chips have a certain amount of memory cells which can be partitioned chip-wise.

Also, it is possible that a partitioning or disk slicing is used. The creation of one or more regions or partitions on a memory area, hard disk, or other secondary storage, so that an operating system can manage information in each region separately. This approach is normally based on blocks provided by the hard disk grouping logical or physical memory cells. The disk stores the information about the partitions' locations and sizes in an area known as the partition table that the operating system reads before any other part of the disk. Each partition then appears in the operating system as a distinct "logical" disk that uses part of the actual disk. Partitioning a drive is when the total storage area of a drive is portioned into different pieces. These pieces are called partitions. Once a partition is created, it can then be formatted so that it can be used on a computer.

In another approach the partition can be implemented on the file system level. The control unit controls and/or modifies the file system table stored in the memory in a way that only certain files or directories are provided to the respective self-service machine. In this context a group of files or directories form a (logical) partition. Each access to the file system table from the operating system is intercepted by the control unit and modified or rejected if necessary. Using local tables, the control unit can re-map the blocks to other memory areas if necessary. Also, the control unit can replace or substitute the file system table and the available storage area assigned to the self-service machine. When plugging in the storage device only grants access to a limited group of files and directories.

The approach that utilizes the file table and the filesystem has the advantage of flexible partitions avoiding situations that in situations where the storage device easily runs out of free memory which can occur if some ATM require a lot of data to be stored on the thumb drive and other only a few bits of data.

In an alternative approach, the control unit of the memory device may present a partition with a file system to the PC with a fixed size, but uses additional logic "behind the visible file system" to manage the free memory pool. In such a case the control unit firmware of the memory device has additional logic about the used file system in these partitions.

In this context the control unit can provide different file system tables using a common memory pool, which means that different blocks can be assigned to different self-service machines and different file systems. A possible approach would be a shared free memory pool with free blocks which can be assigned to different file systems assigned to different self-service machines. This allows an optimal usage of the memory resources.

In such a case, only the allocated parts of the filesystems of the partitions count for the overall allocation on the stick.

An alternative embodiment for using this system of partitions would be to simply use a proprietary file system that is unknown to the operating system of the self-service machine. In such a case a malware could not transfer itself to the memory device without knowing and understanding the proprietary file system.

But in such an approach all software that wants to utilize the space on the memory device needs to use a proprietary API to read and write data.

Another challenge is to design an alternative file system that is solid for cases of intermediate removal of the memory device and other kind of USB stability problems. For usual file systems in the Windows world, Microsoft has made a lot of improvements on this in the last years.

In a preferred embodiment the access control is configured to hide those partitions in the set of partitions which are not assigned to the self-service machine and to show those partitions in the set of partitions which are assigned to the self-service machine. In the preferred embodiment only one partition is displayed for write operations. It is also possible that more than one partition is provided. The control unit recognizes the identity of the self-service machine and provides only those partition or partitions to the self-service machine which are assigned to the self-service machine.

In a possible embodiment there are also different read write permissions possible depending on the identity of the self-service machine. The read write granting is controlled by the control unit.

In a possible embodiment there are at least two groups of partitions. One group defines a set of partitions comprises read and/or write partitions allowing individual read and/or write file operations on the partitions by the self-service machine being assigned to the partition hereby avoiding a data exchange between different the self-service machines, and a second group of partitions contains at least one read only partition.

On this additional partition certificates and/or cryptic keys are stored for determining the identity of the peripheral digital storage device and/or the self-service machine. The keys can be used by the self-service machine to identify the peripheral digital storage device. Using this approach, the self-service machine can also reject digital storage devices which do not store the correct keys. On the other hand, the keys can also be used to identify the self-service machine by the storage device. The self-service machine could read the keys and generate a data with signature based on the keys which can be identified by the controller of the storage device. In case that the signature is correctly generated the controller of the storage device provides access to the partitions which are assigned to self-service machine. In an alternative embodiment the self-service machine loads a public key of the storage device (e.g. the crypto controller) from the partition encrypts or cryptographically signs its identity and tries to write back the encrypted identity. The control unit intercepts the write operation and receives the encrypted identity, which is then transferred to the crypt controller which decrypts or checks the signature of the identity and compares the identity with those stored in its secure memory. If the comparison was successful, the control unit checks internal tables and provides the partition which is assigned to the self-service machine.

The second partition is mounted at the self-service machine (ATM) for read only purpose only. This partition contains data to be transported to the self-service machine, like certificates for authentication. Every self-service machine sees the same partition image. This partition should be written at the technician's notebook only. As this partition is read only, no malware can be copied from an ATM to this partition.

The read only partition can also be skipped, if the relevant data is copied otherwise viewable in the individual partition.

Also, it is possible to encrypt or decrypt the partitions. The decryption and/or encryption process can be performed by the control unit and its crypto controller. The encryption can be based on the on cryptic key being assigned to the self-service machine and/or using a cryptic key which is accessible after entering a PIN by the service engineer. In case that the access is granted to an assigned partition the partition is decrypted and shown to the self-service machine.

In the above description, the partitions may be either read-only or hidden as only security measures.

The partitions may also be stored in an encrypted way. There are already numerous examples of encrypting drives on the market, mainly using AES 256. The key to decrypt the data can be derived from authentication data like the PIN in the case of the CrypTA™ stick.

A further is a method to control the access to the peripheral digital storage device mentioned above.

For performing maintenance operation to the self-service machine, the following steps are performed.

Plugging in the peripheral digital storage device into the self-service machine; (done by the maintenance engineer)

Determining by the control unit an identity of the self-service machine; the identify can be determined as described above.

Providing by the control unit only those partitions to the self-service machine which match the identity;

Mounting by the self-service machine the provided partitions and performing file write or read operation on the partition.

A further embodiment comprises the steps of removing the peripheral digital storage device from the self-service machine. This step is performed after the self-service machine has read and/or written data on the digital storage device. The service engineer has manually removed the peripheral digital storage device. After that the information on the storage device has to be transferred plugging the peripheral digital storage device into a personal computer; also this step is performed by a service engineer.

Accessing the peripheral digital storage device in the personal computer, in a none standard way, avoiding the automatic installation or execution of malware;

directly transferring the data from the personal computer over the network to a server being protected against malware.

The above techniques prevent spreading malware from one ATM to another.

To prevent that the technician's notebook is used for spreading malware the following countermeasures may be utilized:

The notebook is equipped with state of the art Anti-virus and/or intrusion-prevention software.

The notebook OS and additional software is additionally hardened.

The software on the notebook is not mounting the partitions as operating system known file system partitions, but is accessing them in a proprietary way that standard mechanisms to automatically start any malware do not work.

The notebook does not evaluate the data itself on the stick, but simply transfers the partition's data to and from a server that is assumed to be immune against malware. This is a kind of E2E solution.

DETAILED DESCRIPTION

Figure 1:
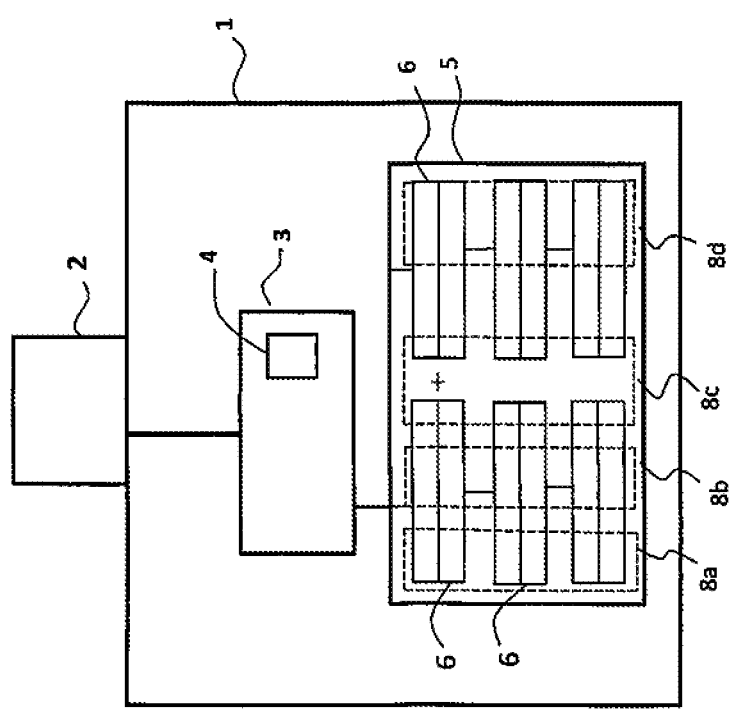
FIG. 1 shows the peripheral digital storage device, having an interface, a control unit, a crypto controller, a memory area with memory chips, and partitions spanning over several memory chips.

FIG. 1 shows the peripheral digital storage device 1 which can have the dimension of a standard USB stick. The peripheral digital storage device comprises an interface 2 which extends out of the housing to be connected to the self-service machine. The interface can be a plug which can be plugged into the USB socket of the self-service machine. Other interfaces are also possible. Interface is connected to a control unit 3. In case of an USB interface the control unit 3 provides USB standard communication. In the preferred embodiment the control unit is a USB controller with additional functionality. Within the control unit 3 a crypto processor 4 is located, which encrypts data and which stores within its local memory encrypted keys and signatures. This crypto controller provides additional functionality to the control unit. The crypto controller allows to encrypt data received by the control unit and which is then stored in the storage area 5. Also, the crypto controller allows to verify signatures and to decrypt information. The control unit 3 communicates depending on the information received over the interface directly with the memory or with the crypto controller. Additionally, the control unit blocks accesses to memory areas to a self-service machine which has not been authenticated. The authentication is performed by providing identity information over the interface to the control unit. The control unit transfers the identity information to the crypto controller which verifies the information using various techniques.

Figure 2:
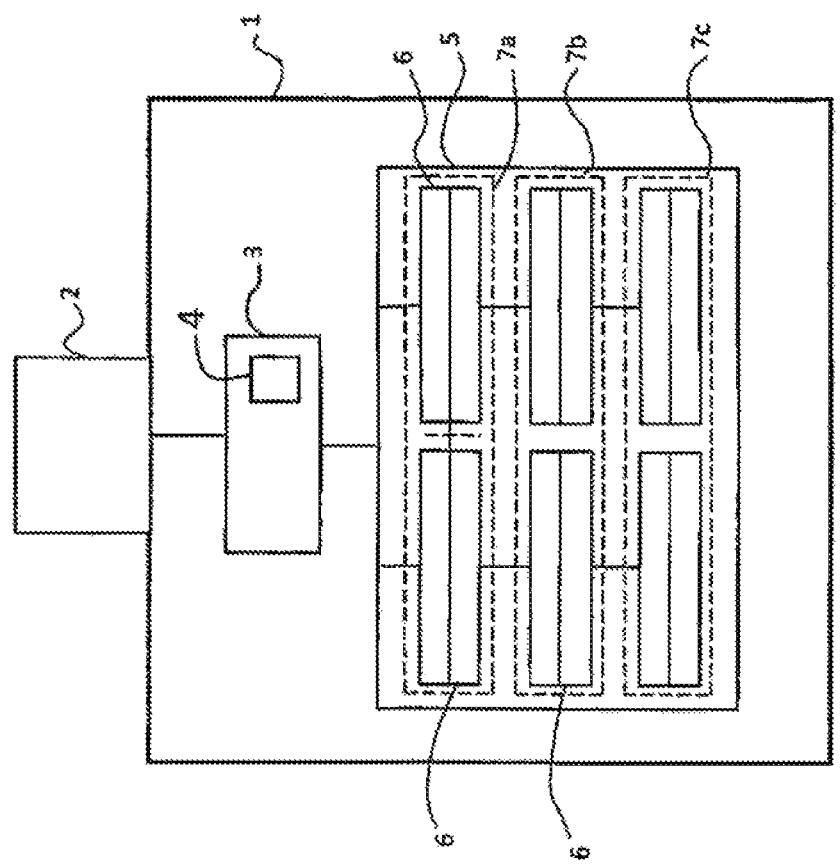
FIG. 2 shows the peripheral digital storage device, having an interface, a control unit, a crypto controller, a memory area with memory chips, and partitions based on physical memory chips.

The memory area 5 comprises several memory chips 6 which can be flash memory chips. Different storage technologies can be used. The memory area can be divided into several partitions 8a-8d. FIG. 1 shows a logical partitioning where each partition spans over several memory chips. FIG. 2 in comparison shows the physical partitioning 7a-7c based on the memory chips. One partition can comprise one or several chips. In this case it is possible that the storage device 1 manages several independent physical disks or volumes. In case of a connection to the self-service machine several independent discs are recognizable.

The configuration in FIG. 1 however provides only one single physical disk to the self-service machine having the partition table which references several logical partitions dividing the storage area into several logical partitions. As mentioned above depending on the configuration the control unit provides only those partitions (physical or logical) to the self-service machine if the identity of the self the machine has been approved.

Figure 3:
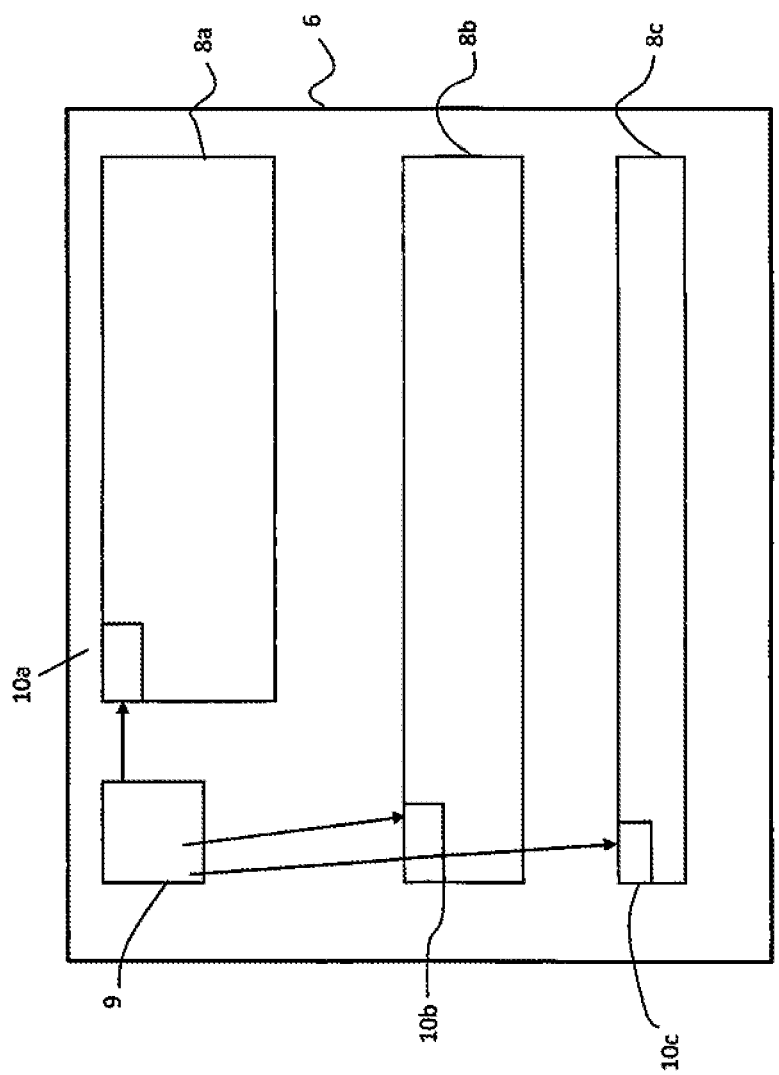
FIG. 3 shows a memory area, with a partition table, partitions referenced by the partition tables and filesystem tables in the partitions.

FIG. 3 shows the memory area 6 divided into several logical partitions. Each partition 8a-8c is referenced by the partition table 9 which is normally stored at the beginning of the memory area 6. When reading information from the storage device normally the partition table is loaded first. The partition table is modified by the control unit before transferring to the self-service machine to contain only those partitions which should be accessible by the self-service machine. Furthermore, all write operations to memory areas which are not allowed to be accessed by the self-service machine are blocked by the control unit. Using this approach, it is prevented that an uncontrolled access is granted to the whole memory area. The partition table 9 references the partitions and especially the filesystem tables 10*a*-10*c* which are also normally stored at the beginning of the partitions. The filesystem table defines the structure of the file system which is stored in each partition.

Figure 4:
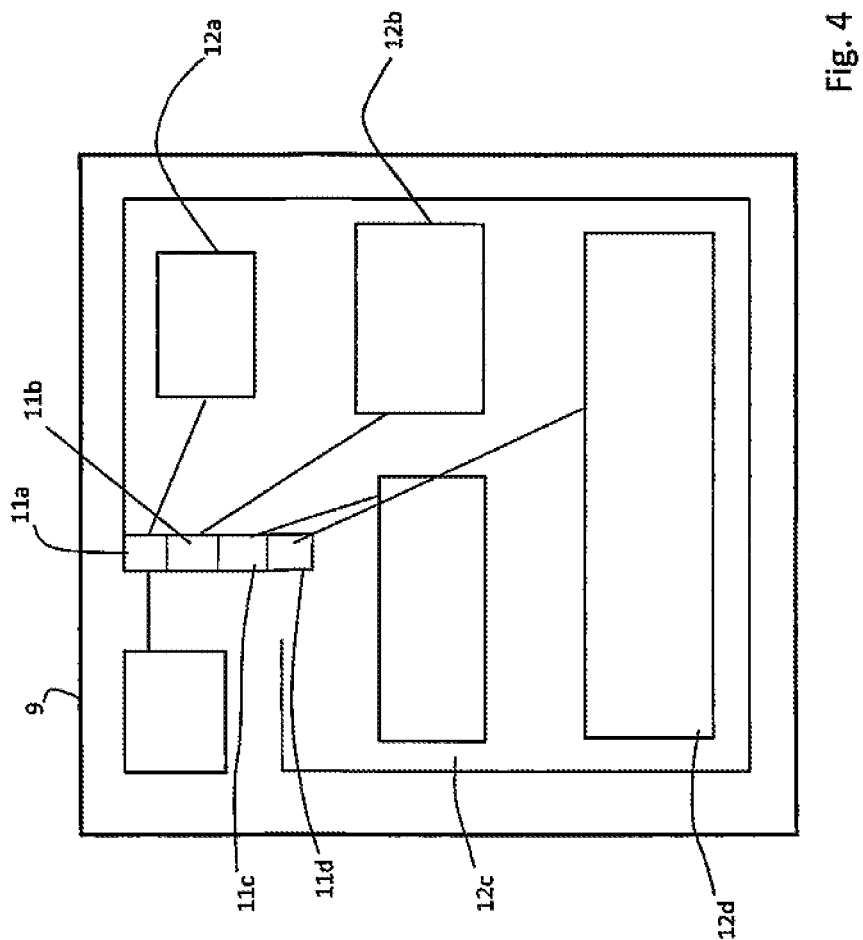
FIG. 4 shows a memory area, with a partition table, one partition and several filesystem tables within the partition.

FIG. 4 shows yet another approach having one logical partition but several filesystem tables 11*a*-11*d*. Each filesystem table 11*a*-11*d* manages the blocks 12*a*-12*d* of the file system which represent files and folder structures. Depending on the identity of the self-service machine the control unit provides one of the filesystem tables managing one filesystem which is assigned to a self-service machine. Also, in this case the write operations are carefully inspected by the control unit and only those are granted which try to access the assigned filesystem.

It has to be noted that one or more partitions can be read only and that one or more partitions can be accessible by the self-service machine.

Figure 5:
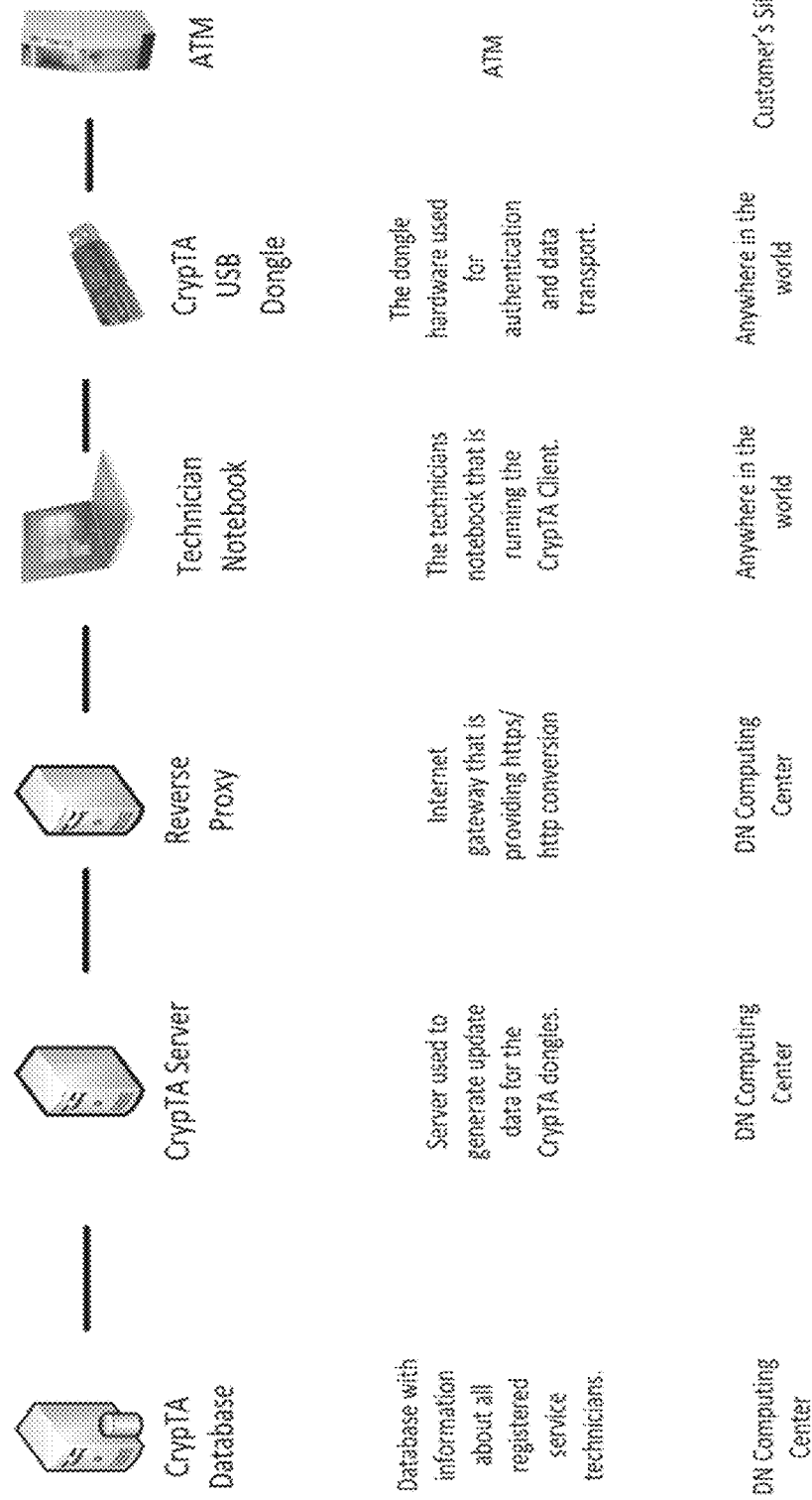
FIG. 5 shows an example of the way of a certificate from a CrypTA™ Database to the ATM.

FIG. 5 shows an example of the way of a certificate from a CrypTA Database to the ATM. In the CrypTA Database information about all registered service technicians are stored. The Location of the CrypTA database is on a server in a secure DN computing center. This database is used to store the relation of a service technicians to the notebook, the CrypTA USB Dongle (also known as peripheral digital storage device) and/or the ATM. Any combination of these information is possible, at control the access to the ATM. Based on the stored information certificates are granted, released, revoked, or rejected. The CrypTA Server is performing this operation, based on the information in the database and the information received over the proxy the technician notebook, the CrypTA USB Dongle, and the ATM. The reverse proxy has the function to control the access from the internet to the CrypTA Server in the DN Computing center. The CrypTA Server is used to generate update data for the CrypTA dongles especially certificates, which are used to get access to the ATM. The CrypTA USB Dongle can be updated after connecting to the Technician Notebook over the internet the Reverse Proxy. Also, data stored on the CrypTA Dongle can be transferred to the CrypTA Server. After an update of the CrypTA USB Dongle using a software called CrypTA Client, which establishes a connection to the CrypTA Server via the Notebook, the dongle is used in the ATM. In the ATM the dongle is used for authentication and data transport and allows an access to the ATM. The dongle is used like a key. Depending on the Database and the update information the dongle grants access different levels and components of the ATM.

What is claimed is:

1. A method to control access to a peripheral digital storage device comprising the steps:
providing a peripheral digital storage device, having an interface allowing a connection to a self-service machine being an automated transaction machine (ATM), for performing maintenance operation to the self-service machine, the peripheral digital storage device including:
a storage device providing a storage area composed of a plurality of memory chips, wherein the storage area is divided into partitions including a first set of partitions which are interpretable by a self-service machine as independent storage areas for file operation when the storage device is connected to the self-service machine and the storage area also includes at least one second partition;
wherein the first set of partitions are further defined as read/write partitions allowing individual read/write file operations on the first set of partitions by the self-service machine being exclusively assigned to the first set of partitions thereby avoiding a data exchange between the self-service machine and a second self-service machine; and
a control unit which is configured to control access to the first set of partitions by refusing or granting the self-service machine access to the first set of partition depending on identity information receivable by the control unit from the self-service machine for providing access to individual partitions of the first set of partitions assigned to the self-service machine connectable to the interface, each of the individual partitions of the first set of partitions being defined by the control unit based on memory chip level such that each of the partitions is defined by one of or a group of the plurality of memory chips, wherein the first set of partitions are further defined by the control unit on a file system level, wherein the control unit dynamically configures a partition table defining physical memory areas for each of the individual partitions of the first set of partitions, wherein depending on the identity information of the self-service machine the control unit is configured to modify the partition table to provide only information of the individual partitions assigned to the self-service machine;
performing a maintenance operation to the self-service machine including:
plugging the peripheral digital storage device into the self-service machine;
determining, by the control unit, an identity of the self-service machine;
providing, by the control unit, access to only those partitions to the self-service machine which match the identity;
mounting, on the self-service machine, the at least one second partition; and
performing, by both of the control unit as well as the self-service machine, only file read operations on the at least one second partition while the at least one second partition is mounted on the self-service machine.

2. The method according to claim 1 further comprising:
controlling access to the file system level with the control unit by providing files and file relevant information only when matching the identity information received from the self-service machine and rejecting the access to files when the identity is not matching.

3. The method according to claim 1 further comprising:
modifying, with the control unit, a filesystem table depending on the identity information of the self-service machine to allow access only to the files which are assigned to the self-service machine.

4. The method according to claim 1, wherein at least one partition of the set of partitions stores certificates and/or cryptic keys for determining the identity of the peripheral digital storage device and/or the self-service machine, wherein the certificates and/or cryptic keys can be used to determine the identity of the self-service machine.

5. The method according to claim 1, further comprising the steps:

removing the peripheral digital storage device from the self-service machine;

plugging the peripheral digital storage device into a personal computer;

accessing the peripheral digital storage device in the personal computer, in a non standard way, avoiding the automatic installation or execution of malware; and directly transferring the data from the personal computer over the network to a server being protected against malware.

6. The method according to claim 1, further comprising the steps:

utilizing a proprietary file system that is unknown to the operating system of the self-service machine;

writing data utilizing a proprietary API; and reading data utilizing a proprietary API.

7. The method of claim 1 further comprising:

writing to the at least one second partition only at a notebook of a technician servicing the ATM.

* * * * *